US005286378A

United States Patent [19]

Gerteis

[11] Patent Number: 5,286,378

[45] Date of Patent: Feb. 15, 1994

[54] SLEEVE FILTER CENTRIFUGE

[75] Inventor: Hans Gerteis, Bietigheim-Bissingen, Fed. Rep. of Germany

[73] Assignee: Heinkel Industriezentrifugen GmbH & Co. KG, Bietigheim-Bissingen, Fed. Rep. of Germany

[21] Appl. No.: 838,815

[22] PCT Filed: Jan. 15, 1991

[86] PCT No.: PCT/EP91/00047

§ 371 Date: Mar. 23, 1992

§ 102(e) Date: Mar. 23, 1992

[87] PCT Pub. No.: WO91/14507

PCT Pub. Date: Oct. 3, 1991

[30] Foreign Application Priority Data

Mar. 24, 1990 [EP] European Pat. Off. ........ 90105624.2

[51] Int. Cl.[5] .......................................... B01D 33/067

[52] U.S. Cl. .................................. 210/232; 210/370; 210/380.1

[58] Field of Search ..................... 210/232, 370, 380.1, 210/391

[56] References Cited

U.S. PATENT DOCUMENTS 4,193,874 3/1980 Gerteis ................................ 210/370

4,543,184 9/1985 Hoffmann et al. .................. 210/193

*Primary Examiner*—Ivars Cintins

*Attorney, Agent, or Firm*—Shenier & O'Connor

[57] ABSTRACT

A sleeve filter centrifuge comprising a drum rotatably mounted in a housing and having radial filtrate passages, an invertable filter cloth covering the filtrate passages, a cover closing one end face of the drum, a feed opening for the suspension to be filtered provided in the cover, a feed pipe passing through the feed opening, and a safety device preventing the drum being opened by the cover being detached from it for as long as the drum is rotating ar a rotational speed higher than a critical rotational speed, above which any opening of the drum would be dangerous, the drum and the cover being axially displaceable relative to one another by means of a rotatably driven hollow shaft and a support shaft telescopically reciprocating therein in order to invert the filter cloth.

4 Claims, 4 Drawing Sheets

SLEEVE FILTER CENTRIFUGE

The invention relates to a sleeve filter centrifuge comprising a drum rotatably mounted in a housing and having radial filtrate passages, an invertable filter cloth covering the filtrate passages, a cover closing one end face of the drum, a feed opening for the suspension to be filtered provided in the cover, a feed pipe passing through the feed opening, and a safety device preventing the drum being opened by the cover being detached from it for as long as the drum is rotating at a rotational speed higher than a critical rotational speed, above which any opening of the drum would be dangerous, drum and cover being axially displaceable relative to one another by means of a rotatably driven hollow shaft and a support shaft telescopically reciprocating therein in order to invert the filter cloth.

The object of the invention is to improve a sleeve filter centrifuge of the generic type in a simple manner and without using a centrifugal governor so that the drum can only be opened when its rotational speed is below a predetermined value.

The object is accomplished in accordance with the invention in that a screw spindle is arranged on the support shaft and a nut engaging with this screw spindle is provided, that either the screw spindle or the nut is rotatingly drivable by a motor so that the support shaft reciprocates telescopically in the hollow shaft in response to the rotational speed of the screw spindle or the nut relative to the rotational speed of hollow shaft and drum, the drum opening when the rotational speed of the screw spindle or nut driven by the electromotor is higher than the rotational speed of the hollow shaft, and closing when the rotational speed of the screw shaft or the nut is lower than the rotational speed of the hollow shaft, and that the maximum rotational speed of the motor is selected such that the maximum rotational speed it imparts to the screw spindle or nut is lower than the critical rotational speed of the drum so that the drum opens only when it is rotated at a rotational speed lower than the critical rotational speed.

The following description of a preferred embodiment of the invention serves to explain the invention in greater detail in conjunction with the attached drawings. In the drawings, FIG. 1 is a schematic side view of a sleeve filter centrifuge in the operative phase of centrifugation;

Figure 1:
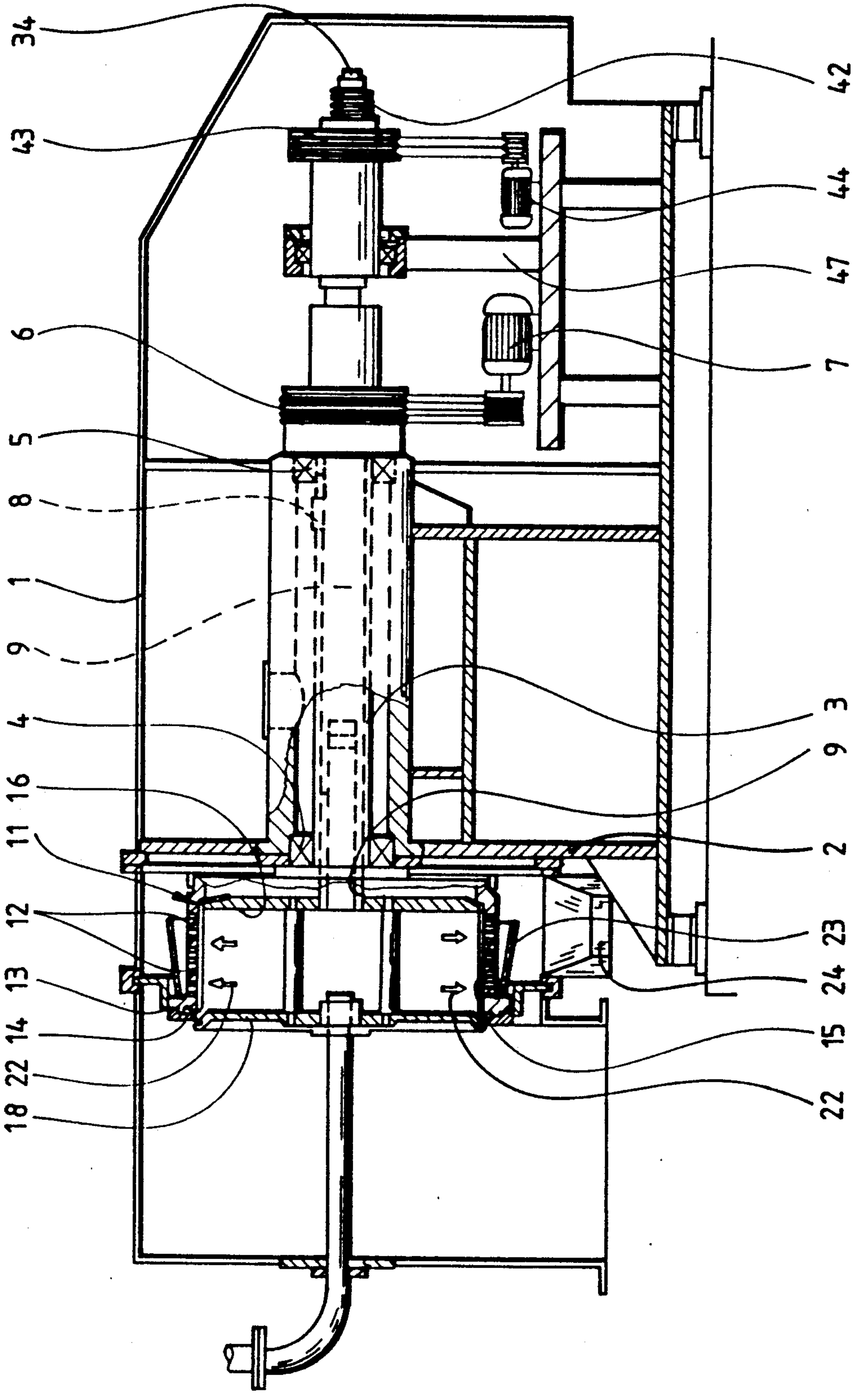

The sleeve filter centrifuge illustrated in the drawings comprises a housing 1 which is indicated schematically and hermetically encloses the entire machine. In this housing, a hollow shaft 3 is rotatably mounted in bearings 4, 5 on a stationary machine frame 2. The end of the hollow shaft 3 protruding beyond the bearing 5 is nonrotatably connected to a drive gear 6, via which the hollow shaft 3 is caused to rotate rapidly by an electric or other motor 7 by means of a V belt.

The hollow shaft 3, which extends rigidly between the bearings 4, 5, has an axially extending wedge-shaped groove which is indicated by broken lines and in which a wedge-shaped member 8 is axially displaceable. This wedge-shaped member 8 is rigidly connected with a support shaft 9 displaceable in the interior of the hollow shaft 3. The support shaft 9 therefore rotates together with the hollow shaft 3 but is axially displaceable therein.

Figure 2:
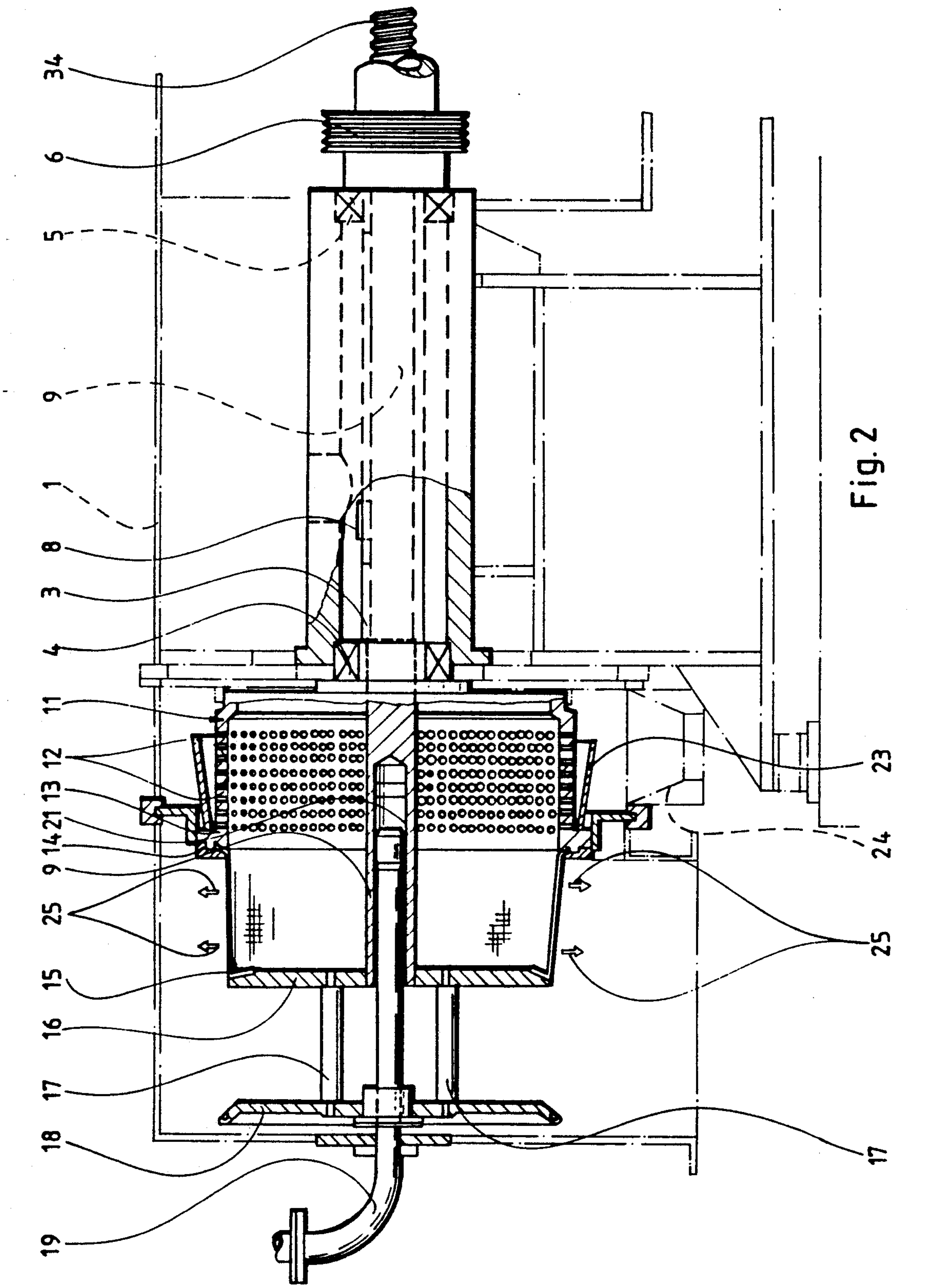
FIG. 2 shows schematically the centrifuge of FIG. 1 in the operative phase of discharging solids.

The closed base of a bowl-shaped centrifugal drum 11 is flange-mounted in a non-rotatable manner on the end of the hollow shaft 3 located to the left in FIGS. 1 and 2 and protruding beyond the bearing 4. The drum 11 has radially extending through openings 12 in its cylindrical casing. The drum 11 is open at its end face opposite the base. The edge of a filter cloth 15 essentially circular cylindrical in design is sealingly clamped by means of a holding ring 14 at the flange-like edge 13 of the opening surrounding this open end face. The other edge of the filter cloth 15 is sealingly connected in a corresponding manner to a base portion 16 which is rigidly connected to the displaceable support shaft 9 which penetrates freely through the base of the centrifugal drum 11.

A centrifugal chamber cover 18 is rigidly attached to the base portion 16 via spacer bolts 17, leaving an intermediate space free. This cover, in FIG. 1, hermetically seals the centrifugal chamber of the drum 11 by engaging on the edge of its opening and, in FIG. 2, is lifted freely away from the drum 11, together with the base portion 16, by axial outward displacement of the support shaft 9 out of the hollow shaft 3.

A feed pipe 19 is arranged at the front end of the sleeve filter centrifuge located to the left in FIGS. 1 and 2. This pipe serves to supply a suspension to the centrifugal chamber of the drum 11 which is to be separated into its solid and liquid components and in the operative state illustrated in FIG. 2 the pipe penetrates into a bore 21 of the displaceable support shaft 9.

The drive means, which brings about the displacement of the support shaft 9 in the hollow shaft 3 and, therefore, the opening and closing of the centrifugal drum and, with it, the transition between the two operative states illustrated in FIGS. 1 and 2, will be described later on.

During operation, the sleeve filter centrifuge first takes up the position shown in FIG. 1. The displaceable support shaft 9 is withdrawn into the hollow shaft 3, whereby the base portion 16 connected to the support shaft 9 is located in the vicinity of the base of the centrifugal drum 11. The centrifugal chamber cover 16 hereby abuts sealingly on the edge of the opening to the drum 11. When the drum rotates, suspension to be filtered is introduced via the feed pipe 19. The liquid components of the suspension pass through the openings 12 of the drum in the direction of the arrows 22 and are guided by a baffle plate 23 into a discharge line 24. The solid particles of the suspension are retained by the filter cloth 15.

When the centrifugal drum 11 continues to rotate, the support shaft 9 is now displaced (to the left) in accordance with FIG. 2, whereby the filter cloth 15 is turned outwards and the solid particles adhering thereto are catapulted outwards into the housing 1 in the direction of the arrows 25. From here they can easily be conveyed away. In the position according to FIG. 2, the feed pipe 19 penetrates through corresponding openings in the cover 18 and in the base portion 16 into the bore 21 of the support shaft 9.

Once the solid particles have been thrown off under the influence of the centrifugal force, the filter centrifuge is returned to the operative position according to FIG. 1 by moving the support shaft 9 back, the filter cloth 15 hereby being turned back in the opposite direction. In this way, it is possible to operate the centrifuge with a constantly rotating centrifugal drum 11; in the operative phase of centrifugation according to FIG. 1, the centrifugal drum 11 is driven by the motor 7 at a considerably greater rotational speed than in the operative state of solids discharge according to FIG. 2. In the latter operative phase the centrifugal drum 11 rotates considerably more slowly.

Figure 3:
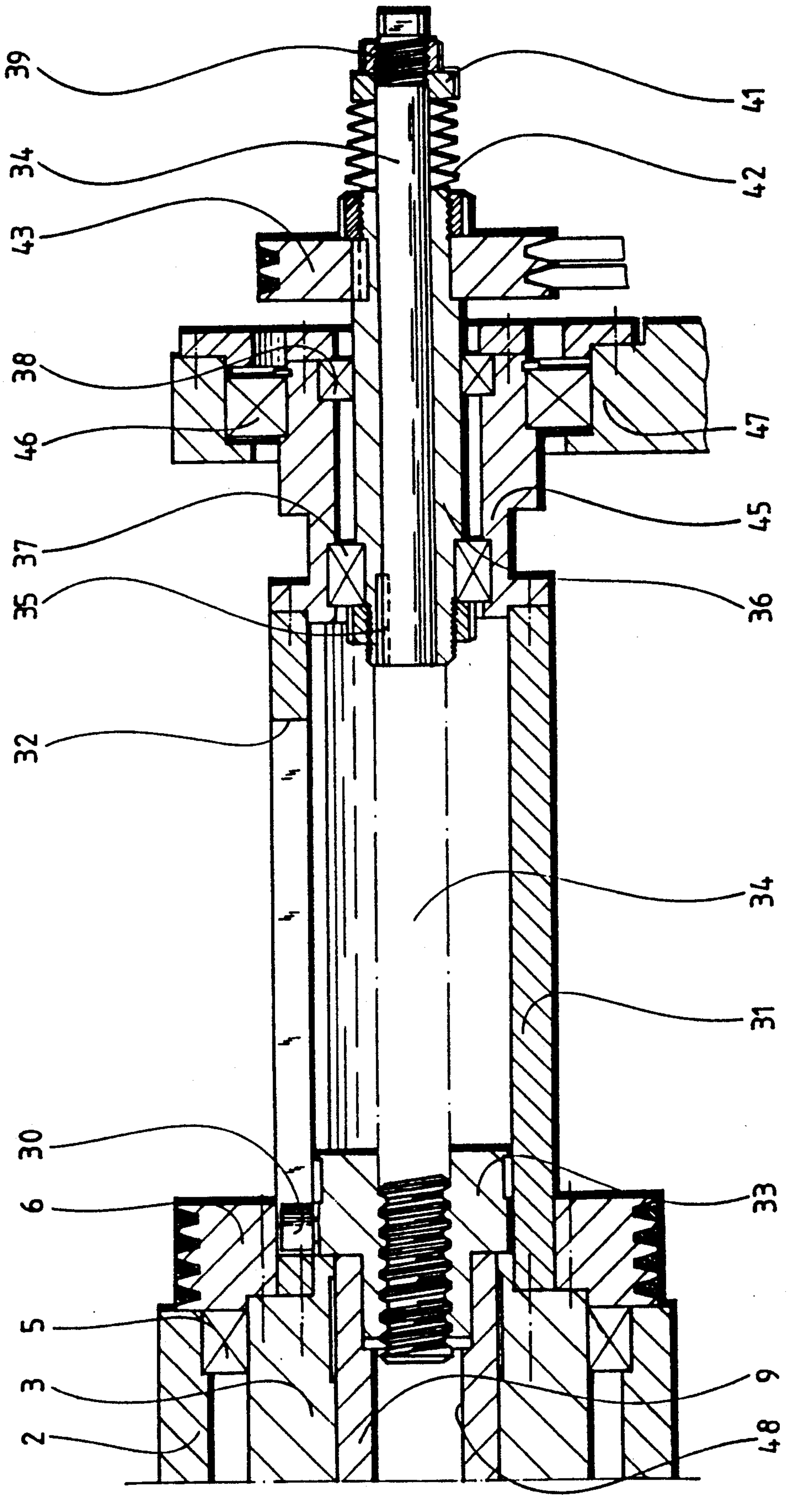
FIG. 3 shows schematically an enlarged view of a mechanical drive means for opening and closing the drum of the sleeve filter centrifuge.

As shown, in particular, in FIG. 3, a bushing 31 is rigidly and non-rotatably flange-mounted at the end of the hollow shaft 3 supported by the bearing 5 and this bushing projects rearwardly and has an axially extending slot 32. A nut 33 having a radially projecting wedge-shaped member 30 is rigidly connected to the rear end of the support shaft 9. The wedge-shaped member engages in the wedge-shaped groove 32 so that the wedge-shaped member 30 provides a non-rotatable connection between nut 33 and support shaft 9, on the one hand, and bushing 31 and hollow shaft 3, on the other, whereby the nut 33 and with it the support shaft 9 are, however, axially displaceable in the bushing 31.

A screw spindle 34 having a corresponding external thread engages in the internal thread of the nut 33 and is connected with a sleeve 36 via a conventional adjusting spring connection 35 so as to be non-rotatable but slightly axially displaceable. The sleeve 36 is, for its part, rotatably mounted with the aid of bearings 37, 38 in an end piece 45 rigidly flanged to the bushing 31. A disc 41 is held on the rearward end of the screw spindle 34 protruding beyond the sleeve 36 by means of a nut 39. A cup spring 42 or the like is arranged between the rear end face of the sleeve 36 and the disc 41. This cup spring biases the screw spindle 34 relative to the sleeve 36 (towards the right in FIG. 3), whereby the adjusting spring connection 35 as mentioned between screw spindle 34 and sleeve 36 allows a slight axial movement between screw spindle 34 and sleeve 36.

A drive pulley 43 is non-rotatably seated on the sleeve 36 and is connected via V belts with an additional electric or other motor 44 (FIG. 1) which therefore rotatably drives the sleeve 36 and, with it, the screw spindle 34 non-rotatably connected therewith via the adjusting spring 35.

The cup spring 42, which biases the screw spindle 34 and, with it, the support shaft 9 as well via the nut 33 (to the right in FIG. 3), has the purpose of holding the cover 18 in firm engagement on the edge of the opening of the centrifugal drum 11 during the operative phase of centrifugation (FIG. 1) and contrary to the hydraulic pressure occurring in the interior of the drum. In more simple embodiments of the invention, the screw spindle 34 could also be rotatably mounted directly in the bearings 37 and 38, i.e. without any intermediate sleeve 36. In this case, the drive pulley 43 would be seated directly on the screw spindle 34 and the cup spring 42 used for the specified purpose would be omitted.

As illustrated in addition, the bushing 31 is rotatably mounted in its own pivot bearing 46 with the aid of the end piece 45 which is flanged to the bushing. This bearing is, for its part, supported on the machine frame 2 by a stand 47 so that the drive forces exerted by the drive pulley 43 and the motor 44 can be absorbed in the vicinity of the bearing 46.

When the screw spindle 34 is rotated via the drive pulley 43 and the motor 44 in one or other direction relative to the hollow shaft 3 and the bushing 31 connected therewith, in which the screw spindle 34 is rotatably mounted, the support shaft 9 connected with the nut 33 is displaced in one or other direction due to the engagement of the screw spindle 34 in this nut so that the cover 18 connected to the support shaft 9 performs the desired opening or closing movement.

During operation of the sleeve filter centrifuge, the hollow shaft 3 bearing the centrifugal drum 11 and the bushing 31 rigidly connected therewith as well as the support shaft 9, which telescopes axially in the hollow shaft 3 and is connected to the cover 18, do, however, constantly rotate in a predetermined direction of rotation. When the cover 18 is opened and closed, it is, therefore, the relative speed of these parts, i.e. in particular of the support shaft 9 and the screw spindle 34, which is important and, above all, whether the screw spindle 34 is driven at a lower or higher rotational speed than the support shaft 9. When support shaft 9 and screw spindle 34 have the same rotational speed, no axial displacement of the support shaft 9 in the hollow shaft 3 takes place. Only when the rotational speed of the screw spindle 34 is higher than the rotational speed of the support shaft 9 will this be displaced in the hollow shaft 3 in the sense of opening the cover 18. If, on the other hand, the rotational speed of the screw spindle 34 is lower than the rotational speed of the support shaft 9 or the screw spindle 34 is driven in the opposite direction to the support shaft 9, the support shaft, and with it the cover 18, will be displaced in the opposite direction so that the cover 18 closes the centrifugal drum 11. In the preferred embodiment of the invention, support shaft 9 and screw spindle 34 always rotate in the same direction of rotation.

The hydraulic drive previously required for opening and closing the centrifugal chamber drum is therefore replaced by a simple mechanical drive which no longer has the disadvantages with respect to leakage of the hydraulic drive. This is not, however, the only advantage of the mechanical screw spindle drive as described. In contrast to the hydraulic drive, in which the support shaft 9 is displaced via a hydraulic cylinder flange-mounted at the rearward end of the hollow shaft 3, the forces required for opening and closing the drum as well as keeping the drum closed do not proceed via the main pivot bearings 4, 5 but are absorbed internally by the screw spindle drive.

Since support shaft 9 and screw spindle 34 rotate, in the illustrated embodiment, simultaneously and in the same direction of rotation and when initiating an axial displacement of the support shaft 9 in the hollow shaft 3 only the difference in rotational speed between these parts 9 and 34 in the positive and negative sense is important, only a relatively small axial stroke of the support shaft 9 is caused by a relatively high, absolute rotational speed of the screw spindle 34. The screw spindle 34 therefore acts in this respect as a screw having a very slight pitch (fine thread) which, again, means that only slight forces are required for its drive and, therefore, the motor 44 driving the screw spindle 34 can be of a relatively low-powered design, and even in the case where support shaft 9 and screw spindle 34 are driven in opposite directions of rotation.

At the end of the respective movement of stroke "opening" or "closing" the centrifugal drum, or even when the movement of stroke is ponderous, the difference in rotational speed between hollow shaft 3 and support shaft 9, on the one hand, and screw spindle 34, on the other, is altered towards zero so that, finally, a synchronous rotation of these parts takes place. In this respect, an increase in force automatically occurs and this has the effect, particularly after the closed state of the centrifugal drum has been reached, that the centrifugal chamber cover 18 is pressed firmly against the edge of the opening of the centrifugal drum 11, even when the motor 44 driving the screw spindle 34 is relatively low-powered.

As soon as the centrifugal drum 11 and, with it, the support shaft 9 attempt to rotate more quickly than the screw spindle 34, the centrifugal chamber cover 18 is automatically kept closed on the centrifugal drum 11, even when the hydraulic forces effective in the centrifugal chamber are greater. The screw spindle closure arrangement as described therefore acts like a screw spindle (provided with a fine thread) with automatic locking which does not require any additional radial locking.

In FIG. 3, the open state of the centrifugal drum according to FIG. 2 is illustrated, in which the support shaft 9 is displaced by the screw spindle 34 right to the left in FIG. 3. As illustrated, the support shaft 9 has a hollow space 48 in front of the nut 3 connected with it and the screw spindle 34 enters this hollow space when the support shaft is brought back (to the right in FIG. 3) during the course of the closing movement of the centrifugal drum. In this respect, the nut 33 is displaced accordingly in the bushing 31 forming a rearward extension of the hollow shaft 3.

In one embodiment of the invention which is not illustrated, the screw spindle can be a spindle without automatic locking which can, for example, be realized by a conventional rotary ball spindle. In this case, the force required for keeping the centrifugal drum 11 securely closed is provided by the motor 44 which is constantly switched on and drives the screw spindle 34 at a lower rotational speed than the electromotor 7 the hollow shaft 3 and, with it, the support shaft 9.

It is also possible to have a separate, connectable brake acting on the motor 44 or on a corresponding section of the screw spindle 34. In this case, the motor 44 itself can serve as a brake, in particular, when this motor is a frequency regulated electromotor.

It is, in addition, possible to switch off the motor 44 driving the screw spindle 34 completely once the closed or opened state of the drum has been reached. Due to the automatic locking of the screw spindle 34 in the nut 33, the screw spindle 34 and, with it the motor 44, is then taken along during idling by the hollow shaft 3 driven by the motor 7.

Figure 4:
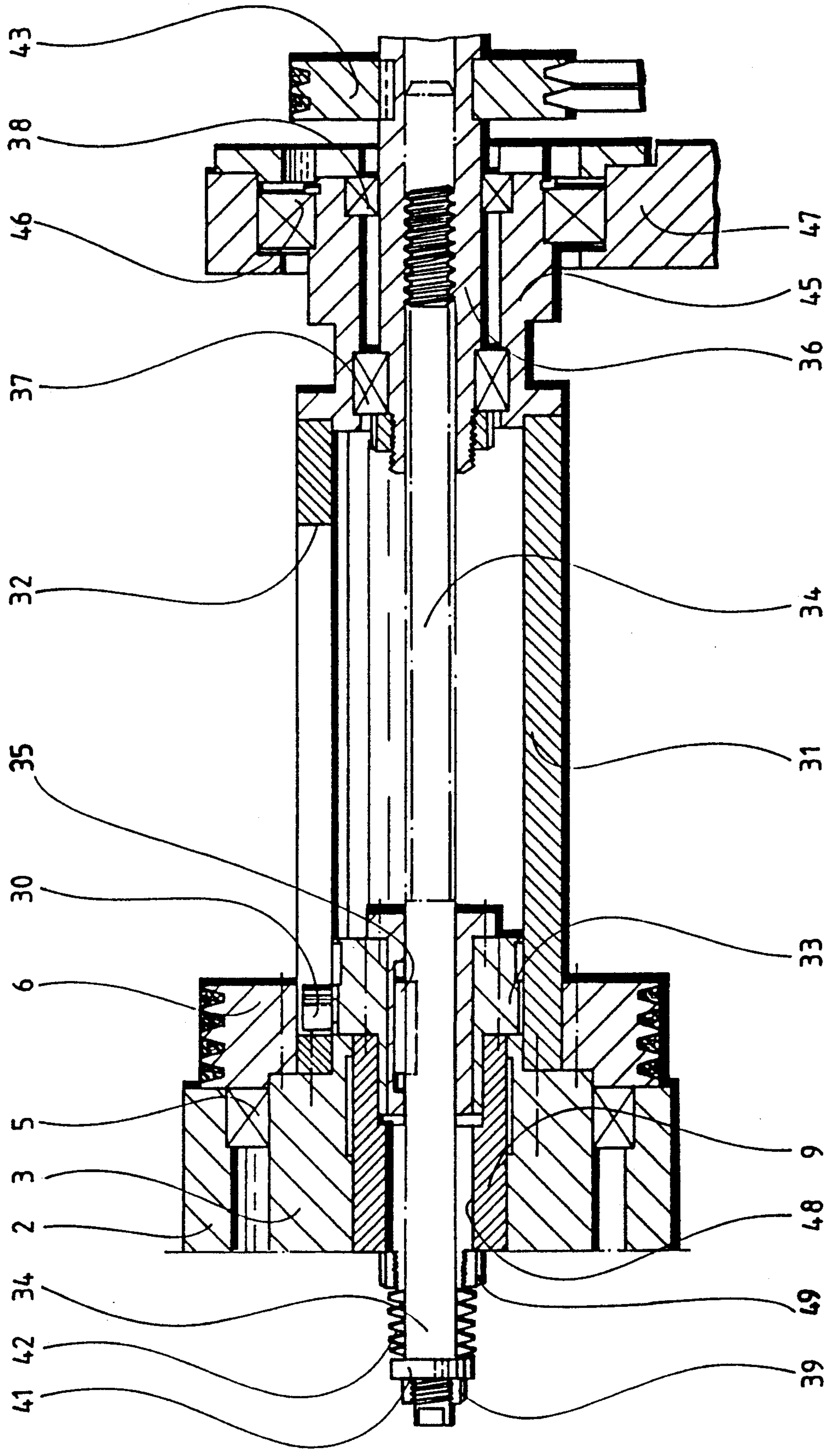
FIG. 4 shows schematically an embodiment modified in comparison with FIG. 3.

FIG. 4 shows a further modified embodiment of the invention. In FIG. 4, parts corresponding to one another have been given the same reference numerals as in FIGS. 1 to 3. Whereas in the embodiment according to FIG. 3 the screw spindle 34 is rotatably driven via the drive pulley 43 and the motor 44 in order to displace the support shaft 9 in the hollow shaft 3, in the embodiment according to FIG. 4 the screw spindle 34 is non-rotatably connected with the support shaft 9 and the sleeve 36 designed as a nut has an internal thread which engages with the external thread of the screw spindle 34. The sleeve 36 is mounted in the end piece 45 so as to be axially non-displaceable and is caused to rotate via the drive pulley 43 and the motor 44 so that the screw spindle 34 and, with it, the support shaft 9 are displaced axially back and forth, whereby the centrifugal chamber cover 18 is opened or closed in the manner already described.

As illustrated in FIG. 4, the screw spindle 34 is mounted via an adjusting spring 35 in a part 33 so as to be slidingly displaceable in axial direction. This part is, for its part, rigidly connected to the support shaft 9. In this way, the screw spindle 34 is non-rotatably connected to the support shaft 9 but can be axially displaced relative thereto over a limited distance. In the interior of the support shaft 9, the disc 41 is held by the nut 39 and one end of the cup spring 42 is supported on this disc. The other end of the cup spring 42 abuts in the hollow space 48 of the support shaft 9 on an inner shoulder 49 or the like so that the cup spring 42 attempts, as in the embodiment according to FIG. 3, to bias the support shaft 9 such that in the operative phase of centrifugation (FIG. 1) the centrifugal chamber cover 18 is held in firm engagement on the edge of the opening of the centrifugal drum 11. The embodiment according to FIG. 4 represents a "kinematical inversion" in comparison with the embodiment according to FIG. 3. The two embodiments correspond to one another in their functioning and advantages.

With the design of a sleeve filter centrifuge as described, with screw spindle closure of the centrifugal drum, it can be ensured in a simple manner that the centrifugal chamber cover 18 lifts off the centrifugal drum 11 only when this drum is rotated at a rotational speed below a predetermined value ("critical rotational speed").

As already specified, an axial opening movement of the support shaft 9 takes place only when the screw spindle 34 is driven at a higher rotational speed than hollow shaft 3 and support shaft 9. Otherwise, the support shaft 9 carries out the closing movement or holds the cover 18 firmly on the edge of the opening of the drum 11.

In accordance with the invention, the motor driving the screw spindle 34 is designed such that it has a fixed, maximum rotational speed which cannot be exceeded at all. Motors of this type are known per se. This maximum rotational speed of the motor 44, in particular electromotor 44, is selected such that—taking into consideration a gear (drive pulley 43) provided between motor 44 and screw spindle 34 or sleeve 36 and having a corresponding step-up or step-down—the rotational speed of the screw spindle 34 is always lower than a critical rotational speed of the drum 11, above which the drum may not be opened as otherwise the sleeve filter centrifuge could be wrecked.

It is therefore ruled out that the drum can open in the operative phase of centrifugation (FIG. 1), during which the drum rotates at a maximum rotational speed. In the course of this operative phase the motor 44 is indeed driven by the rotating drive pulley 43 at a rotational speed which is higher that its maximum rotational speed but at this higher rotational speed the motor does not act as a drive motor but as a generator. The screw spindle 34 does not, in this operative state, have a different speed to the support shaft 9.

Only when, during transition from the operative phase of centrifugation into that of solids discharge (FIG. 2), the rotational speed of the drum 11 sinks below the critical rotational speed and finally reaches a value which is below the maximum rotational speed of the motor 44 or of the screw spindle 34, will a difference in speed occur between the support shaft 9 and the screw spindle 34 which results in the cover 18 being lifted automatically away from the drum 11.

In this way, it is amazingly easy to ensure that without additional safety devices, for example a centrifugal governor or the like, it is possible for the drum 11 to open only when it rotates at a lower rotational speed than its critical rotational speed.

The motor 44 is preferably designed such that it can be regulated in its rotational speed in the region below its maximum rotational speed. This means that the opening and closing speed of the drum 11 can be increased or decreased.

It is also possible, to achieve different opening and closing speeds for the drum 11, to connect to the screw spindle 34 a plurality of selectively switchable motors having different rotational speeds. However, the maximum rotational speeds of all these motors are selected such that the rotational speeds of the screw spindle 34 or sleeve 36 they bring about are lower than the critical rotational speed of the drum 11, any opening of the drum 11 entailing danger when this speed is exceeded.

Also, a regulatable change-over gear can be arranged in a manner known per se between the electromotor 44 and the screw spindle 34 to control the rotational speed of the motor 44 below its maximum rotational speed and, with it, the rotating speed of the screw spindle 34 accordingly.

The term used here, i.e. "lower rotational speed" than the critical rotational speed of the drum 11, also means a rotational speed which is negative, i.e. contrary to the direction of rotation of the drum 11.

I claim:

1. Sleeve filter centrifuge comprising a drum (11) rotatably mounted in a housing (1) and having radial filtrate passages (12), an invertable filter cloth (15) covering the filtrate passages, a cover (18) closing one end face of the drum, a feed opening for the suspension to be filtered provided in the cover, a feed pipe (19) passing through the feed opening, and a safety device preventing the drum being opened by the cover being detached from it for as long as the drum is rotating at a rotational speed higher than a critical rotational speed above which any opening of the drum would be dangerous, said drum and cover being axially displaceable relative to one another by means of a rotatably driven hollow shaft and a support shaft telescopically reciprocating therein in order to invert the filter cloth, a screw spindle (34) arranged on the support shaft (9) and a nut (33, 36) engaging with this screw spindle, a motor (44) constructed and arranged to rotatingly drive that either the screw spindle (34) or the nut (36) so that the support shaft (9) reciprocates telescopically in the hollow shaft (3) in response to the rotational speed of the screw spindle (34) or the nut (36) relative to the rotational speed of hollow shaft (3) and drum (11), the drum (11) opening when the rotational speed of the screw spindle (34) or nut (36) driven by the motor (44) is higher than the rotational speed of the hollow shaft (3), and closing when the rotational speed of the screw shaft (34) or the nut (36) is lower than the rotational speed of the hollow shaft (3), and the maximum rotational speed of the motor (44) being such that the maximum rotational speed it imparts to the screw spindle (34) or nut (36) is lower than the critical rotational speed of the drum so that the drum opens only when it is rotated at a rotational speed lower than the critical rotational speed.

2. Sleeve filter centrifuge as defined in claim 1, wherein the rotational speed of the motor (44) driving the screw spindle (34) or nut (36) is regulatable in a region below its maximum rotational speed.

3. Sleeve filter centrifuge as defined in claim 1, wherein the screw spindle (34) or nut (36) is drivable by a plurality of selectively switchable motors having different rotational speeds, and the maximum rotational speeds of these motors being such that the maximum rotational speeds they impart to the screw spindle (34) or nut (36) are lower than the critical rotational speed of the drum (11).

4. Sleeve filter centrifuge as defined in claim 1, wherein a regulatable change-over gear is arranged between the motor (44) and screw spindle (34).

* * * * *

UNITED STATES PATENT AND TRADEMARK OFFICE
CERTIFICATE OF CORRECTION

PATENT NO. : 5,286,378

DATED : February 15, 1994

INVENTOR(S) : Hans Gerteis

It is certified that error appears in the above-identified patent and that said Letters Patent is hereby corrected as shown below:

Column 8, line 8 - delete "that".

Signed and Sealed this

Thirty-first Day of May, 1994

*Attest:*

Bruce Lehman

BRUCE LEHMAN

*Attesting Officer*

*Commissioner of Patents and Trademarks*